US012379711B2

(12) United States Patent
Gemignani

(10) Patent No.: US 12,379,711 B2
(45) Date of Patent: Aug. 5, 2025

(54) CONTROLLING AN APPARATUS WITH A BEHAVIOR TREE

(71) Applicant: Magazino GmbH, Munich (DE)

(72) Inventor: Guglielmo Gemignani, Munich (DE)

(73) Assignee: Jungheinrich AG, Hamburg (DE)

( * ) Notice: Subject to any disclaimer, the term of this patent is extended or adjusted under 35 U.S.C. 154(b) by 275 days.

(21) Appl. No.: 17/592,346

(22) Filed: Feb. 3, 2022

(65) Prior Publication Data
US 2022/0244708 A1 Aug. 4, 2022

(30) Foreign Application Priority Data

Feb. 4, 2021 (EP) ..................... 21155238

(51) Int. Cl.
G05B 19/4155 (2006.01)
B25J 9/16 (2006.01)
(52) U.S. Cl.
CPC ........ G05B 19/4155 (2013.01); B25J 9/1664 (2013.01); *G05B 2219/39254* (2013.01)
(58) Field of Classification Search
CPC ...... G05B 19/4155; G05B 2219/39254; G05B 19/042; G05B 19/0426; G05B 2219/39107; G05B 2219/39158; G05B 2219/40392; G06F 8/34; B25J 9/1664; B25J 9/163
See application file for complete search history.

(56) References Cited

U.S. PATENT DOCUMENTS

| 2004/0153212 A1 | 8/2004 | Profio et al. |
| 2005/0138544 A1 | 6/2005 | Beck et al. |
| 2012/0010772 A1* | 1/2012 | Pack ............... B25J 9/1664 |
| | | 701/27 |
| 2017/0161035 A1 | 6/2017 | Abadi et al. |
| 2018/0367365 A1* | 12/2018 | Jiang ............... G06F 9/4498 |
| 2019/0086894 A1* | 3/2019 | Tenorth ............ G05B 19/042 |

(Continued)

FOREIGN PATENT DOCUMENTS

| CN | 103838563 A | 6/2014 |
| CN | 105117575 A | 12/2015 |
| CN | 109189504 A * | 1/2019 ......... G06F 9/44505 |

(Continued)

OTHER PUBLICATIONS

Opsive, Documentation Tree sections "Behavior Manager" and "Conditional Aborts". NPL Date Sep. 18, 2020 (later of two). Both section files provided in single .pdf file. Retrieved from internet Jan. 30, 2024, URL: <https://opsive.com/support/documentation/behavior-designer/behavior-manager/> (Year: 2020).*

(Continued)

*Primary Examiner* — Thomas E Worden
*Assistant Examiner* — Benjamin J Brosh
(74) *Attorney, Agent, or Firm* — ALG Intellectual Property, LLC

(57) ABSTRACT

A method and a system for controlling an apparatus using a behavior tree for an assigned task performed by the apparatus. The behavior tree includes a planner section and an activation section. The method includes calling the planner section, determining the state of the apparatus and setting an activation status by the planner section in response to being called, and evaluating the activation status before executing the assigned task.

20 Claims, 3 Drawing Sheets

(56) References Cited

U.S. PATENT DOCUMENTS

2022/0035339 A1* 2/2022 Saunders ............. G05D 1/0088

FOREIGN PATENT DOCUMENTS

| EP | 3214510 A1 | 9/2017 |
|---|---|---|
| JP | 2004114285 A | 4/2004 |
| JP | 2009230569 A | 10/2009 |
| WO | 2017148830 A1 | 9/2017 |

OTHER PUBLICATIONS

Opsive, Documentation Tree sections "Behavior Manager" and "Conditional Aborts". NPL Date Sep. 18, 2020 (later of two). Both section files provided in single .pdf file with previous office action. Retrieved from internet Jan. 30, 2024 (Year: 2020).*

Opsive, "Behavior Manager" and "Conditional Aborts". NPL Date Oct. 4, 2020 (later of page and video). Provided as a combined .pdf file. Retrieved from internet Jun. 5, 2024. URL: <https://opsive.com/support/documentation/behavior-designer/conditional-aborts/> (Year: 2020).*

Foreign patent documents are provided as a combined .pdf file including a translation and authority copy.*

Opsive, "Behavior Manager" and "Conditional Aborts" combined as a single PDF including embedded video screenshots and transcript of video, NPL date: Oct. 2020 (latest date), retrieved from internet Jun. 2024, URL: <https://opsive.com/support/documentation/behavior-designer/conditional-aborts/> (Year: 2020).*

"Extended European Search Report received in EP Application No. 21155238.5-1218 on Jul. 19, 2021."

Anonymous, et al.,"Behavior Tree (Artificial Intelligence, Robotics and Control)—Wikipedia", Dec. 18, 2020, KP055822529, retrieved from the internet: https://en.wikipedia.org/w/index.php?title=Behavior_tree_(artificial_intelligence,_robotics_and_control)&oldid:994954127 (retrieved on Jul. 8, 2021).

Berenz, et al., "Reactive Programming for Orchestrating Robotic Behavior", IEEE Robotics & Automation Magazine, IEEE Service Center, Piscataway, NJ, US, vol. 25, No. 3, Sep. 1, 2018, pp. 49-60, (retrieved on Sep. 13, 2018).

Champandard, et al., "The Behaviour Tree Starter Kit", Game AI Pro Collected Wisdom of Game AI Professionals, (2014), pp. 73-91, URL: http://file.allitebooks.com/20150721/Game%20AI%20Pro-%20Collected%20Wisdom%20of%20Game%20AI%20Professionals.pdf, (Aug. 24, 2016), XP002761049 [A] 1-15 p. 73-p. 91 2014.

Marzinotto, et al.,"Towards a Unified Behavior Trees Framework for Robot Control", 2014 IEEE International Conference on Robotics and Automation (ICRA). IEEE, 2014.

Shoulson, et al., "Parameterizing Behavior Trees", Allbeck J.M., Faloutsos P. (eds) Motion in Games. MIG 2011. Lecture Notes in Computer Science, vol. 7060. Springer, Berlin, Heidelberg. https://doi.org/10.1007/978-3-642-25090-3_13.

Wikipedia, et al., "Behavior tree (artificial intelligence, robotics and control)", Internet, (Jan. 13, 2016), URL: https://en.wikipedia.org/w/index.php?title=Behavior_tree_(artificial_intelligence,_robotics_and_control)&oldid=699680860, (Aug. 23, 2016), XP002761048 [X] 1-15.

* cited by examiner

CONTROLLING AN APPARATUS WITH A BEHAVIOR TREE

RELATED APPLICATIONS

The present application claims priority to European Patent Application No. EP21155238.5, filed Feb. 4, 2021, the contents of which is hereby incorporated by reference in its entirety.

BACKGROUND INFORMATION

Generally, robots are not limited to performing basic preprogrammed tasks, but they may implement decision-making to react to their current environment and/or its history of actions, i.e., previous and/or failed tasks, previous and/or current path. Furthermore, robots perform increasingly more complex and diverse tasks. In particular, tasks can be layered such that they are at least partly performed simultaneously (i.e., navigating, relative movement of control arms, interacting with the environment). Thus, mapping the control of a robot by means of a behavior tree can result in a complex and highly specialized behavior tree.

Therefore, implementing the control of robots using behavior trees requires expert knowledge, is very labor intensive and thus exhibits a high probability for logical errors, programming errors and/or errors due to unforeseen combinations of environmental factors.

Nevertheless, the behavior tree may contain several subtrees, respectively action blocks, which are repeated at different places of the behavior tree due to high level tasks depending on executing similar or identical core functions, respectively subtrees. This can be detrimental to the efficiency of the control as complexity and/or efficiency, meaning the time necessary to query the behavior tree can increase. Furthermore, this circumstance can make coding of the behavior tree tedious and its maintenance complex and error-prone.

Although the basic function implemented by a subtree may be similar or identical, preconditions and postconditions might vary depending on the type of apparatus. Thus, the subtree-elements may not be readily interchangeable, as specific safety condition may be checked before executing a task (i.e., grasping an object). Consequently, behavior trees are rather complex and are not suitable to be analyzed or manipulated by some type of high-level reasoning mechanism. Adding to the complexity is the fact that higher level functions which can outline the abstract task to be completed are intertwined, respectively not logically separated from device specific action blocks. Thus, a behavior tree may not be readily transferable between apparatus that can complete the same abstract task, but require different action blocks, i.e., subtrees to function.

Furthermore, document WO 2017/148830 A1 discloses the usage of a behavior tree task architecture for tasking a robot. A basic behavior tree architecture comprises a root node, a flow control node and an execution node which are connected via directed edges. Document WO 2017/148830 A1 is incorporated by reference in its entirety and its disclosure is incorporated in the content of this application.

Commonly, behavior trees can be traversed at a set tick frequency, which may generally be relatively high. This is computationally very expensive and inefficient. Furthermore, traversing the behavior tree may involve passing data between nodes. Depending on the type of data, each transfer may incur a computational cost. Thus, a high behavior tree tick frequency may be computationally expensive and inefficient.

BRIEF DESCRIPTION OF THE DRAWINGS

Illustrative embodiments will now be described with reference to the accompanying drawings. These embodiments exemplify, but do not limit, the scope of the disclosure.

DETAILED DESCRIPTION

Figure 1:
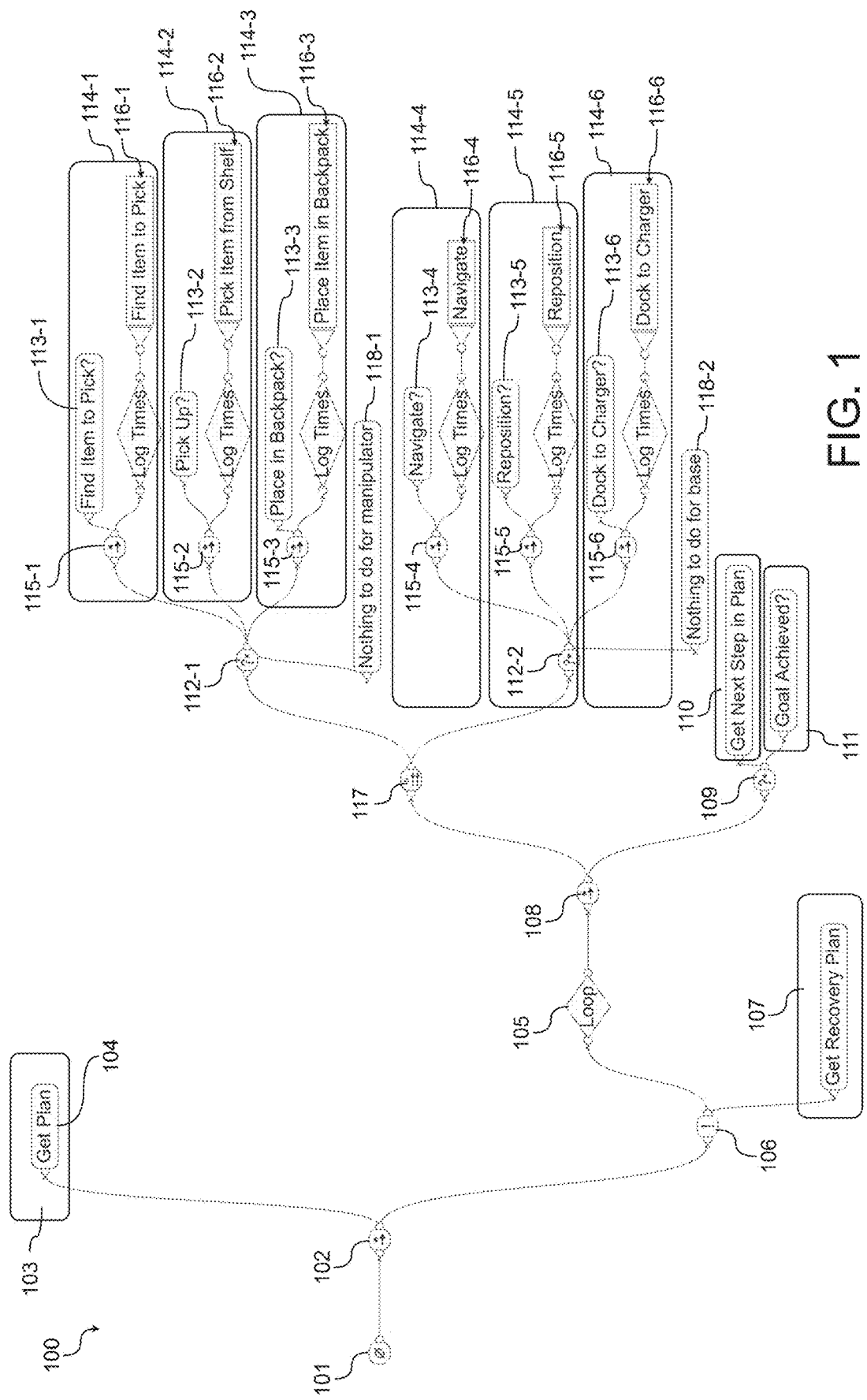
FIG. 1 schematically depicts an embodiment of a behavior tree according to features described herein.

The features described herein relate to the field of controlling a technical apparatus, e.g., a robot. More specifically, the features relate to an apparatus control based on behavior trees.

In light of the above-described problems, the features described herein seek to overcome or at least alleviate the shortcomings and disadvantages of known behavior tree implementations. The robots and methods described herein provide an improved system and method for controlling an apparatus by means of behavior trees.

According to an aspect, the features described herein relate to a method for controlling an apparatus. The method includes a step of using a behavior tree for tasks performed by the apparatus.

By implementing a behavior tree switching between and/or executing different tasks in an autonomous agent, such as a robot (which may be the apparatus in embodiments) can be structured. Thus, a behavior tree is a means for describing complex apparatus behaviors as a composition of subfunctions which can be modular. The subfunctions can further be structured as a combination of parallel and/or sequential nodes. Thus, based on the degree of dependency of the functions, they can be performed in parallel or in sequence. Behavior trees are an intrinsically hierarchical, efficient means for creating complex control systems that are both modular and reactive.

The apparatus can be a handling robot configured to grip and move items from one location to another. The control system of the handling robot can be completely or at least partially mapped to a behavior tree.

In one embodiment, the behavior tree comprises nodes including a root node, at least one control flow node and at least one execution node and directed edges. The nodes are connected with the directed edges: the root node has one outgoing edge and no incoming edge, each control flow node has one incoming edge and at least one outgoing edge and each execution node has one incoming edge and no outgoing edge. A node having an outgoing edge is defined as a parent node in relation to another node connected to this edge and a node having an incoming edge is defined as a child node in relation to another node connected to this edge. The control flow nodes and the execution nodes are adapted to return different states to their respective parent nodes. The states include success, running and failure.

Furthermore, the method may include the steps of the root node calling its child node, which is a control flow node; the root node's child node calling a first node; the first node returning a first state to the root node's child node; the root node's child node returning a second state to the root node.

Typically, each node implements one function for executing the corresponding task or action that sets a node-internal execution state to the value RUNNING, SUCCESS, or FAILURE. The execution nodes can update their status based on the result of the sub-action they perform. The control flow nodes update their status based on the status of their children. The execution state is updated to SUCCESS if the action has been successfully completed, updated to FAILURE if the action could not be completed, and updated to RUNNING if the action is still ongoing.

The behavior tree may comprise a planner section and the method may comprise calling the planner section. In response to being called, the planner section may determine a state of the apparatus and may set an activation status of at least one activation section.

The planner section may also be referred to as a planner subsection. The planning can be implemented both as a single node, but also in a more complex manner, i.e., as a section comprising different nodes, i.e., as a subtree. The planner section can be represented as a single task or more complex, i.e., a sequence of tasks. The planner section can be configured to execute an automated planning technique. In particular, abstract action representations can be used to represent the action blocks encoded by behavior sub-trees. Thus, a modular system of action blocks can be created, which can be combined based on combinatorial rules implemented in the planner section. Planning formalisms, including Planning Domain Definition Language (PDDL) or other similar representations, can be used accordingly.

A plurality of first action blocks can be linked to a first independent resource of the apparatus and a further plurality of second action blocks can be linked to a second independent resource of the apparatus. An apparatus resource can be a motor function module, a sensory module, a logic module, and/or a navigational module. Practical examples include a motorized mobile base, an object manipulator, object scanning and/or recognition modules, object tracking modules and/or power supply modules.

Action blocks can use the available resources to execute a predefined function and/or task. Examples pertaining to a warehouse robot can include: identify item to pick, pick Item from shelf, place item in backpack, navigate, reposition and/or dock to charger.

The resources can be independent in the sense that they can be used at least partially simultaneously, i.e., while moving the mobile base of a robot, the manipulator can also be moved. Thus, the resources can be conditionally independent: Depending on the current state of the robot, resources may be prevented from being accessed simultaneously, more precisely, while a task requiring the first independent resource is active, other tasks requiring access to the second independent resource may be prevented from running. The prevention of running such sub-trees can be implemented structurally by adjusting the composition of the behavior tree accordingly or supervisory due to the execution node preventing specific nodes from executing. Practical examples concerning a warehouse robot include disabling navigating while picking an item from a shelf, enabling navigating while placing an item in the backpack. This may be achieved by the planner section determining a state of the apparatus, and the planner section setting an activation status of at least one activation section (wherein the activation section typically is a section—a node or a subtree—of the behavior tree).

An action block can receive input data, i.e., the type of object to be manipulated, the type of object manipulator, and/or the position of the object manipulator. Furthermore, specific preconditions can apply to execute an action block. For example, is the object manipulator suitable to manipulate the type of object?, is the object positioned at an expected location?, is the robot positioned at the correct location, where the object can be manipulated (i.e., correct shelf)?, is the object manipulator free (i.e. not occupied with a different object and/or currently in use)?.

Once sub-trees are represented in the above-mentioned abstract action representations, they can be composed automatically using automated planner techniques in order to dynamically condition the robot behavior tree and choose the right sub-tree to use in every new situation, i.e., after a failure has occurred. In other words, the planner section can be configured to dynamically change the execution of behavior tree by altering the composition of sub-trees and/or single nodes.

A behavior tree representing a specific process can be universal in the sense that it is compatible with at least two structurally different apparatuses. Two different apparatuses can be, for example, two robots with different drive trains, gripping mechanisms, sensor arrays and/or component latencies. The robots can be generic mobile base robots with a manipulator built on top of it.

The state of the apparatus determined by the planner section may depend on the current general goal to be achieved by the apparatus and a status of the environment of the apparatus. For example, the status of the environment may indicate the presence of a moving object (which may be, e.g., a human in the vicinity of the apparatus), and the general goal of the apparatus may be, e.g., pick up an object, or travel from a first location to a second location depending on the state of the apparatus, the planner section may set the activation status of at least one activation section of the behavior tree, and preferably of a plurality of activation sections of the behavior tree.

The planner section can be configured to define the current robot task, in particular on the basis of the current position of the robot, the type of object to be manipulated, the type of object interaction means available (i.e., a gripper) and the position of the object relative to the robot, respectively object interaction means.

The planner section may also be referred to as a planner sub section.

The state of the apparatus can comprise at least one of location information, relative position information of at least one motorized apparatus element, object information of at least one object the apparatus interacts with. Thus, such information may be taken into account when setting the activation status of the individual activation sections. This information may thus be used to switch on and off certain functionalities present in the behavior tree.

The method can further include the step of the activation section evaluating the activation status before executing the assigned task. This may achieve the advantage of increasing the probability of executing the assigned task successfully, preventing harm (e.g., some tasks may not be performed when a person is located close to the apparatus) and/or of increasing efficiency of the operation of the apparatus. In particular, the task may be executed depending on the activation status.

The method can include the step of the activation section preventing execution of the assigned task based on the activation status. This may achieve the advantage of increasing efficiency by excluding unrequired functions from executing, rendering operation of the apparatus saver and/or decreasing the likelihood of the task to fail due to executing a function that may conflict with other functions or the current status of the apparatus, in particular the current environment of the apparatus.

Furthermore, the method can include the step of the planner section determining the state of the apparatus based on the status of at least one control flow node.

The planner section can be a planner node. Furthermore, the planner section can be a planner subtree of the behavior tree. That is, the planner section can be realized either as a single node, or as a subtree comprising a plurality of nodes. In particular, the planner section can be a planner subtree with a sequence node as a parent node, wherein that sequence node can be a child to the root node. A plan can be generated by executing the planner subtree and the plan can be provided to a parent node of the planner subtree and/or as a global result outside the behavior tree structure.

The behavior tree can comprise a plurality of subtrees, each subtree comprising at least one control flow node and at least one execution node. The control flow nodes can represent a composite task which can have multiple child tasks. Alternatively, the control flow node can represent a decorator that wraps a single child task. The execution nodes may also be called the leaves of the behavior tree and update their status based on the result of the child-task they perform. The control flow nodes can update their status based on the status of their children (e.g., SUCCESS, FAILURE, RUNNING).

The control flow nodes can be placed between the root node and the execution nodes. The control flow nodes and the execution nodes can be configured to return different states to their parents' nodes, and the method may include the steps of the root node calling a control flow node; the control flow node calling a first node; the first node returning a first state to the control flow node; and the control flow node returning a second state to the root node. The first and second states may be equal to or different from one another.

The method can comprise the control flow node being called by the root node calling the planner section. Generally, the behavior tree can be traversed periodically and in particular in a depth-first manner, starting from the root node to facilitate the implementation of reactive behavior. The root node and control flow nodes may trigger the execution of their child nodes. The root nodes initiates traversing the behavior tree by calling a control flow node. In turn, the control flow node can call the planner section. This may achieve the advantage that prior to stepping through the remained of the behavior tree, in particular the subtree hierarchically below the control flow node calling the planner section, the behavior tree can be reevaluated and/or adjusted by the planner section. Thus, the behavior tree may be customized with respect to the current task of the called control flow node.

The control flow node called by the root node can be a sequence node. A sequence node can be the first node of a subtree comprising sub-actions pertaining to a specific task. Thus, a complex task, can be broken down into a combination of several less complex subtrees. The control flow is described by the structure of the behavior tree, thus determining the order and under which conditions these subtrees are to be executed. Each subtree can be executed via its designated, respectively preceding control flow node.

Generally, a sequence node can call its children in a specific order, wherein the execution cumulates in the completion of the general task assigned to the sequence node.

The planner section can be called by the control flow node called by the root node before any other node is called by the control flow node called by the root node. This may achieve the advantage that prior to executing the remainder of the behavior tree, the planner section can be called to setting the activation status of the activation sections in the behavior tree.

Alternatively, the planner section can be disposed hierarchically deeper into the behavior tree. In particular, nodes relating to essential function checks of the apparatus, i.e., a basic robot health status check can be called before the planner section is called.

The plurality of subtrees can comprise at least one function subtree. Each function subtree can comprise a function tree control flow node, an activation section comprising at least one node being a child node of the function tree control flow node, and a function section comprising at least one node being a child node of the function tree control flow node. Thus, each function of the apparatus (e.g., robot), in particular motorized functions and/or functions requiring a sensor read out, can be mapped into the behavior tree following a predefined structure. The function tree control flow node can serve as the entry point to the function. Specifically, all nodes pertaining to the execution of that specific function in the behavior tree can be disposed hierarchically below the function tree control flow node. The division into the activation section and the function section can achieve the advantage of separating queries and acquiring the decision whether the function is to be executed into the activation section. The activation section is preferably called prior to the function section being called. The function section can comprise a node which, for example, executes a motor function of the apparatus.

Furthermore, the function subtrees can be ordered in a specific sequence to represent a logical structure in the behavior tree. For example, an object cannot be picked up, when the gripper currently holds another object.

For each function subtree, the activation section can be an activation node. Thus, the complexity of the behavior tree can be reduced.

For each subtree, the function tree control flow node can be a sequence node. This achieves the advantage that the activation section and the function section can be called in a specific sequence, where calling subsequent nodes can depend on the result of previously executed and in particular hierarchically parallel nodes. Specifically, the activation section can be called prior to the function section being called by means of a corresponding sequence set in the sequence node. Thus, the activation section (e.g., the activation node) is called first and the subsequent nodes are only called when the activation section is activated, i.e., provides the status "success" to its parent node. This may be a simple and efficient way to implement the activation functionality.

For each subtree, the function section can be a lower ranking child section of the function tree control flow node than the activation section. This can achieve the advantage of the function section being called in dependence of the result of the activation section. Thus, the function tree control flow node can call or not call the function section based on the result of the activation section. Thus, the function section can base calling its child nodes on the result of the activation section.

The at least one function subtree can be a plurality of function subtrees. In particular, a plurality of functions pertaining a specific resource of the apparatus can be disposed hierarchically parallel to one another. Furthermore, a plurality of sub functions which together form a greater function can be grouped and structured into a function subtree. Thus, the organizational structure of a function subtree can be self-repeating to build a complex function by combining a plurality of function subtrees.

The at least one activation section for which an activation status is set by the planner section can be at least one activation section of the at least one function subtree. This may achieve the advantage of the planner section being able to control the execution of a function via setting an activation status. Thus, when the respective function subtree is called, i.e., by calling the tree control flow node and subsequently the activation section of the respective function subtree, the activation status can be checked and the result of the activation section can be based on the activation status. The activation section can determine whether the function available for execution via the function section should be executed based on the activation status.

The at least one activation section for which an activation status is set by the planner section can be a plurality of activation sections of the plurality of subtrees, and preferably all activation sections of the plurality of subtrees. This may achieve the advantage that the planner section can control the execution of each function by setting an activation status. The activation status can comprise a plurality of activation information, wherein each activation information pertains to the execution of a respective function subtree. Thus, the planner section can determine which functions to execute to complete the current task.

The apparatus can comprise a hardware resource and the method can include the step of the at least one function subtree manipulating the hardware resource when executed. This may provide the capability of the apparatus to interact with its environment. The hardware resource can be any type of powered device capable of executing a measurable impact on the environment of the apparatus. Preferably, the hardware resource is a motorized component, wherein the function subtree is configured to control the motorized component to move a part of the motorized component relative to its environment and/or to move the apparatus relative to its environment. More broadly, the hardware resource can be powered electrically and/or hydraulically and an environment manipulation can be defined, for example, as moving parts of the environment, rearranging objects in the environment, removing parts of the environment, in particular, remove to store on or within the apparatus. The manipulation of the hardware resource can be defined as operating the hardware resource via control commands, which can be contained in a program executed by the function section and/or function node within the function subtree.

Furthermore, the method can comprise the step of the function section of a subtree accessing the hardware resource and/or manipulating the hardware resource. This can achieve the advantage of limiting access to the hardware resource to the function section. Thus, any safeguards pertaining to the manipulation of the hardware resource can be checked within nodes hierarchically above and/or within nodes called prior to calling the function section. The function section may further include safeguards checked during executing the hardware manipulation. For example, when part of the motorized component is moved relative to the environment continuous, respectively periodic, collision checks can be performed. Furthermore, the manipulation of a hardware resource can be an activation of a motor function, reading out sensor data or activating a sensor to record sensor data. Accessing the hardware resource can be a precursor to manipulating the hardware resource or can include manipulating the hardware resource.

The hardware resource can be one of a motorized element configured to move the apparatus relative to its environment, a motorized element configured to manipulate an object separate from the apparatus, and a sensor element configured to capture the environment of the apparatus. The manipulation of an object can comprise moving the object relative to the object environment, rotating the object, compressing the object and/or connecting the motorized element to the object. A connection can be achieved via a force-locking mechanism, magnetic attraction and/or frictionally and/or gravity assisted resting of the object against part of the apparatus, specifically part of the hardware resource, i.e., a motorized component.

The method can comprise the step of the function section of a subtree executing at least one of locating an object, manipulating the object, moving the object, gripping the object, navigating, repositioning, docking at a charging station, emergency stop. Thus, a single function can be executed by a function section or a plurality of functions can be executed by the function section. In particular, a group of functions can be executed by the function section representing a logically connected part of the overall task to be achieved by completely stepping through the behavior tree. For example, the function subtree can comprise the steps pertaining to the acquisition of an object: locating the object, positioning the motorized component to grip the object, moving the object to a storage component of the apparatus. The overall task can then be moving the object from one location to another, in particular to a location that is a distance away from the original location that is greater than the reach of the motorized component.

The behavior tree can comprise a recovery plan section and the method can include the step of the recovery plan section receiving and/or generating a recovery plan when called. Generating a recovery plan can be defined as determining which function sections to execute as a next step when executing the main parent node of the plurality of function sections. The recovery plan section can receive a recovery plan, in particular a recovery plan comprising an alternate task to be executed or an alternate version of the original task to be executed. The recovery plan section can achieve the advantage that the task can be completed although the main task to be executed via the loop node may have initially failed, by providing an alternate solution and/or an alternate task. Thus, a complete failure of the behavior tree can be averted by executing the recovery plan section.

The recovery plan section can be a recovery plan node or subtree. Having only a recovery plan node may achieve the advantage that the recovery plan does not require further child nodes to be executed. This can speed up the recovery process as executing further nodes can incur further delays due to the nodes requiring a run time and/or due to subsequent nodes requiring further results that may incur a delay. The recovery plan being a subtree can achieve the advantage of a structured recovery plan comprising a plurality of connected nodes. Each node of the plurality of nodes can represent an action to be executed to complete the recovery plan to achieve the set goal and/or avoiding a complete failure of the behavior tree.

The behavior tree can comprise a sequence node and a selector node. The selector node can be a child node of the sequence node and the method can comprise the step of the sequence node calling the selector node last in the sequence of calling its child nodes. In particular, all currently planned functions according to the activation status and the composition of function subtrees can be called prior to calling the selector node. The selector node can be configured to acquire a new task and/or a new plan.

The behavior tree can comprise a plan activation section which is a child section of the selector node. The method can comprise the step of the selector node generating or receiving a plan step information representing a task or a next step of the current task of the apparatus. The plan activation section can be configured to retrieve the task or the next step to be executed of the current task. The plan activation section can further be configured to receive a belief state of the apparatus as an input and to output the plan to activate the subtrees to be executed when the plan activation section completes. The belief state of the apparatus can represent the current status of the apparatus, comprising at least part of the information regarding the environment of the apparatus available to the apparatus via its sensors and or indirectly from the history of its previously executed functions. The belief state can comprise the position and/or orientation of the apparatus in its environment and/or the position and/or orientation of a resource of the apparatus, i.e., a motorized component. Additionally, the belief state can comprise information regarding the interaction with a specific, in particular task related, object positioned in the environment. For example, whether the object is gripped by the motorized component, and/or the orientation of the motorized component in relation to the object.

This plan can be divided in steps or tasks, wherein the task can comprise multiple steps. The plan activation section can be configured to sequentially request a plurality of steps, respectively tasks from the planner section. The sequentially requested steps and/or tasks can form a complete plan to be executed by the apparatus via the behavior tree control.

The plan activation section can be configured to request a new step and/or task from the planner section after the previous step has been completed. The previous step can complete by calling the loop node. For each call of the loop node, the function subtrees or their respective function sections can be activated or deactivated by the apparatus status.

Thus, the activation plan section can be configured to verify each next step or task to be executed in terms of the overall plan to be completed and/or to update the apparatus status according to the received step or task. This may achieve the advantage that changes of the plan can be detected and implemented. This can also represent a safeguard to confirm that the plan has not changed.

The method can include the step of the plan activation section calling the planner section at each instance the plan activation section is called, wherein the activation section is configured to compare a step received from the planner section to a previously planned step to determine if the plan has changed. After the execution of a first or previous step, in particular by calling the loop node, the plan activation section can check if the plan has not changed by calling the planner and retrieving another plan.

The behavior tree can comprise a plan completion section and the method can include the step of the plan completion section checking if the last step of the plan is executed and if the last step of the plan succeeded. The plan completion section can be disposed as a child node of the selector node and/or hierarchically parallel to the plan activation section. The plan completion section can be called sequentially after the plan activation section is called and/or completed. In the case of the last step failing and not receiving an alternative step, task or plan by the planner section, the plan completion section may return FAILURE. Subsequently the selector node, recovery node and finally the root node may fail. A failed root node may require a reset, in particular a manual reset of the apparatus.

The behavior tree can comprise a loop node, and the recovery plan section is provided as a child node hierarchically parallel to the loop node. A subtree representing a current task of the apparatus can be provided as a child node to the loop node. The loop node can be a primary node which is disposed hierarchically above all apparatus resource nodes, function subtrees and/or the selector node. The loop node can be configured to execute its child node in a loop for a number of times as long as the loop node succeeds. The loop node may call its child node indefinitely as long as each iteration succeeds. The loop node can be configured to succeed if its child node succeeds every time, and to fail if its child node fails once.

The method can include the step of the recovery plan section executing a recovery sequence. The recovery sequence can achieve the advantage of avoiding a complete failure of the behavior tree. In particular, the recovery sequence can include one of resetting function parameters of the apparatus pertaining to functions available via function subtrees, backtracking previously executed steps, i.e., executing functions with inverse parameters and/or in reverse order relative to their execution order, executing an apparatus retrieval which enables the apparatus to return to a known location and/or resetting the current task.

The behavior tree can comprise a recovery node and the loop node and the recovery plan section can be child sections of the recovery node. Furthermore, the method can include the step of the recovery node calling the loop node and the recovery node calling the recovery plan section, when the loop node fails.

The behavior tree can comprise a parallel node, which is configured to have two (or more) child nodes attached and configured call the child nodes in parallel. The method can include the step of the parallel node calling its child nodes simultaneously. This may achieve the advantage of executing tasks simultaneously. When one of the child nodes fails, the parallel node may terminate all other child nodes that are still running. The termination of the node can be implemented as a request to the node by the parallel node to terminate its current task. Child nodes of the parallel nodes are not necessarily run exactly parallel. However, the relative starting and/or ending time of the execution of a child node can be inconsequential to the starting and/or ending time of every other child node. Thus, the sequence of calling the child nodes of the parallel node can be arbitrary.

The method can further include the step of the parallel node setting its result to failed when one of its child nodes fails and setting its result to succeeded when all child nodes succeed. This mode is also known as ParallelAll.

Alternatively, the parallel node may succeed as soon as one child node succeeds. This mode is also known as ParallelOne.

According to a further alternative embodiment, the parallel node can call all children in parallel and it may fail if all child nodes fail and succeed if one child node succeeds. This mode is also known as ParallelSelector.

The root node calling its child node can comprises the root node calling its child node with a constant tick frequency, wherein the inverse of the tick frequency defines a constant tick interval. Ticking can be defined as executing the child node and update the status of the root node on the result of the execution of the child node.

Traversing the behavior tree at a constant tick frequency can imply that to satisfy the timing requirements of the different actions controlled by the behavior tree, the maximum required frequency of all the actions is to be adopted by the entire tree. Thus, a single child node requiring a high frequency can lead to the whole behavior tree being ticked at that high frequency to keep the timing of the behavior tree coherent.

In particular, the tick frequency can be lower than a required update frequency of a child node. For example, a child node pertaining to sensor monitoring may require a constant tick frequency of 1 kHz but the tick frequency of the behavior tree may be an order of magnitude lower, i.e., smaller than 100 Hz.

The step of using a behavior tree can comprise an executor application executing the behavior tree. The executor application can be configured to initiate the root node calling its child node and thus initiate a complete parsing of the behavior tree. In particular, a request by the executor application to the root node can supersede any constant tick frequency. Thus, the request is processed immediately and in turn the behavior tree parsed immediately. More specifically, the executor application may not be bound by the set tick frequency and may implement an event-based trigger mechanism to calling the child node and all subsequent nodes of the root node.

The method can comprise a node providing a tick request to the executor application and, in response thereto, the executor application causing the root node to call its child node at a time. A time difference of this time minus the last previous time when the root node called its child node can be smaller than the constant tick interval.

The constant tick frequency can be in the range of 0.1 Hz to 100 Hz, preferably 0.2 Hz to 10 Hz. The tick frequency can represent an update interval of the apparatus, respectively the behavior tree. The constant tick frequency can be lower, preferably at least an order of magnitude lower than an update frequency of a node. The update frequency of the node may be determined by the type of hardware, the node interacts with. Thus, a constant update frequency achieves the advantage of a higher energy efficiency without compromising responsiveness of the system. Each node may, independent of the constant tick frequency, still request a tick of the behavior tree outside the tick intervals determined by the constant tick frequency.

As an example, consider that the constant tick interval is 1 s, i.e., the constant tick frequency is 1 Hz. Thus, the behavior tree is usually traversed once per second, which may be sufficient for some functions. For example, in case a robot is used in a warehouse, it may be sufficient if the robot checks once per second whether it received a request to transport an item from a first location to a delivery location. However, there may be certain functions for which it is advantageous that a faster response is possible. Consider, e.g., that the robot, after having received a request to pick up an object, travels to a location of the object and senses the presence of a human. In this scenario, safety mechanisms may apply. For example, the robot may brake, or may set off an alarm warning the human. In such a scenario, it may be desirable that such a reaction is initiated faster than with the constant tick interval of 1 s. In embodiments, this is possible by the anode providing a tick request to the executor application and the executor application causing the root node to tick its child node "immediately", i.e., without waiting the constant tick interval after the last tick. This may ensure a high responsiveness of the apparatus.

At the same time, the described scheme may be very efficient, as the behavior tree may normally be operated with a constant (and relatively low) frequency. Thus, the presently described technology may allow for a very efficient operation, while at the same time allowing for a high responsiveness.

According to an embodiment the method can comprise the step of the node providing a tick request to the executor application based on a status change of the node, a status change of one of its child nodes and/or a status change of a subtree disposed hierarchically below the node. This may achieve the advantage of realizing an event-based polling mechanism. Every node comprised in the behavior tree may request the executor application to tick the behavior tree at any moment in time. When ticking the behavior tree, a recomputation of the state of the behavior tree, respectively the apparatus and/or task represented by the behavior tree is triggered, when a specific event is detected by any node composing the behavior tree. If no event is detected and thus no particular tick request arrives to the executor, a constant tick frequency is adopted.

According to an embodiment, the method can include the step of the executor application calling the root node independent of the constant tick interval upon receiving a tick request. This may achieve the advantage that the behavior tree may be executed immediately upon receiving a tick request and an update of the apparatus status can be achieved with a comparable latency when comparing to a high constant tick frequency, wherein a high constant tick frequency refers to a tick frequency at least an order of magnitude higher than the implemented constant tick frequency in combination with the node-based tick request mechanism.

According to an embodiment, each of a plurality of the nodes may comprise at least one data element indicator indicating at least one data element related to the respective node. Data elements can be passed between nodes via their shared link connections. In particular, the data may be transferred between nodes upon completion of the sending node. A data element indicator can achieve the advantage that the respective data element can be accessible to at least two nodes of the behavior tree simultaneously. For example, one node may currently execute a task and change the value of the at least one data element. Another node may access the at least one data element via the at least one data element indicator. Access to the at least one data element via the at least one data element indicator can be independent of the state (i.e., SUCCESS, FAILURE, RUNNING) of the node the at least one data element is related to. Thus, the advantage can be achieved that data can be passed between nodes during the execution of a node, which in particular can modify the value of the at least one data element during its execution. The data element indicator can be accessible to any node being called.

The at least one data element indicator can comprise at least one required input value data indicator. Each required input value data indicator can indicate a data element whose value is required to be passed to the respective node for execution of the respective node. The connections between the nodes in the behavior tree specify the control flow and thereby the order in which the tasks associated with each node, respectively subtree are performed. That is, the directed edges discussed before relate to the control flow. However, this control flow is generally independent of the data flow, i.e., the rules indicating if and how data can be shared between different parts of the behavior tree. In some implementations, specific data elements can be passed between nodes. The specific data elements passed between nodes may not be available globally, to avoid conflicts with specific data elements of other nodes, respectively tasks. A node can be configured to define which data elements will serve as their input and which data elements will serve as their output. Data elements specified as an input can be read by the node, and data elements that are specified as an output can be written to by the node. The required input value indicator can be available to the executor application so that the executor application can take the data requirements into account at a compilation time (i.e., before the behavior tree is executed). This can achieve the advantage that it can be verified that the required input data is actually available prior to the execution of the node (i.e., produced by another task and/or node).

Furthermore, the at least one data element indicator can comprise at least one required input reference data indicator and each required input reference data indicator indicates a reference to a data element, which reference is passed to the respective node for execution of the respective node. The input reference data indicator can indicate to the executor application that the respective data element is to be made available to a node via reference. Thus, not the data element itself may be passed to the node, but a reference pointing to the data element. This can achieve the advantage of reducing the amount of data necessary to be transferred between nodes. Decreasing the amount of data transferred between nodes can increase the speed at which the behavior tree can be executed The at least one data element indicator can comprise at least one constant value data indicator. Each constant value data indicator can indicate a data element whose value is constant at runtime and whose value is required to be passed to the respective node for execution of the respective node. The constant value data indicator can indicate to the executor application that the respective data element may not change its value during execution. Thus, the data element labeled by a constant value data indicator can be set during compilation. Further checks regarding change and/or availability of the data element can be omitted.

The at least one data element indicator can comprise at least one changing value data indicator. Each changing value data indicator indicates a data element whose value is required to be updated whenever the respective node is called. That is, data elements indicated by a changing value data indicator are updated whenever the respective node is ticked. This may be different to prior art approaches, where data elements were only updated once a node succeeded. Instead, in implementations of the present technology, such data elements (indicated by a changing value data indicator) are updated at every tick of the node, i.e., also when the respective node is still running (and has not yet returned that it succeeded). This may be advantageous, e.g., in case two nodes run in parallel and both make use of a changing data element.

The at least one data element indicator may comprise at least one optional input value data indicator, wherein each optional input value data indicator indicates a data element whose value is not required to be passed, but can be passed, to the respective node for execution of the respective node. The optional input value data indicator can indicate to the executor application that the respective data element can be missing when executing the respective node that comprises the respective data element as an input. Thus, the node may evaluate the data element being indicated as an optional input when the respective data element is present, but the execution may not fail, when the respective data element is not present.

The at least one data element indicator may comprise at least one output data indicator, wherein each output data indicator indicates a data element accessible by at least one node other than the node comprising the respective output data indicator. Data elements that are specified as output can be written to by the node. A data element can be specified as an input and as an output, thus the node is required to pass the value through. Additionally, the node can modify the data element according to the associated task executed when the node is called.

The apparatus may move freely in space. The apparatus may move along a two-dimensional surface. However, the surface can be curved and/or comprise steps. Generally, any terrain may be traversed according to the capability of a moving base of the apparatus. The apparatus can also be an airborne device and thus can be configured to orient itself and navigate in a three-dimensional space.

The apparatus may be a robot. The robot can be an electro-mechanical machine, capable of making decisions based on its sensory input and translate the sensory input into an action to be performed. Thus, a robot can make a decision based on its environment and may act, within its parameters, independently from external control.

The recovery node can be configured to execute a recovery task. A Recovery task executes the first child node which can represent a main task and will call the other child nodes one after the other to recover from a failure of the main task. If the first child succeeds, the recovery task succeeds as well and no further child nodes are called. If the first child node fails, it continues with the other child nodes until one of them succeeds. If all child nodes fail, the recovery task fails as well. A recovery node can increase the resilience of the apparatus to failure due to changing environmental conditions and/or changes of the underlying hardware. Due to environmental changes, preconceived primary actions may fail and executing tasks for recovering from failures may account for large parts of a robot's control program.

The present disclosure also relates to a software product, configured to perform the method as described before.

In particular, the software product may be configured to perform the method as described before, when run on an assembly comprising a data processing system and the apparatus.

It will be understood that the software product may typically be run on the data processing system. This data processing system may be part of the apparatus, or may be external to the apparatus and both configurations (and any other configuration, e.g., where the data processing system is partly located on the apparatus and partly external to the apparatus) should be understood to be comprised by the assembly comprising the data processing system and the apparatus.

The concepts described herein are further described with the following numbered embodiments.

Below, method embodiments will be discussed. These embodiments are abbreviated by the letter "M" followed by a number. Whenever reference is herein made to "method embodiments", these embodiments are meant.

M1. A method for controlling an apparatus, wherein the method includes a step of using a behavior tree for tasks performed by the apparatus.

M2. The method in accordance with the preceding embodiment, wherein the behavior tree comprises nodes including a root node, at least one control flow node and at least one execution node and directed edges, wherein the nodes are connected with the directed edges, wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge, wherein the control flow nodes and the execution nodes are adapted to return different states to their parents nodes, the states including success, running and failure, the method including the steps of: the root node calling its child node, which is a control flow node; the root node's child node calling a first node; the first node returning a first state to the root node's child node; and the root node's child node returning a second state to the root node.

M3. The method according to the preceding embodiment, wherein the behavior tree comprises a planner section, and wherein the method comprises calling the planner section, wherein in response to being called, the planner section determines a state of the apparatus and sets an activation status of at least one activation section.

M4. The method according to the preceding embodiment, wherein the state of the apparatus comprises at least one of location information, relative position information of at least one motorized apparatus element, object information of at least one object the apparatus interacts with.

M5. The method according to any of the preceding embodiments with the features of M3, the method including the step of the activation section evaluating the activation status before executing the assigned task.

M6. The method according to any of the preceding embodiments with the features of M3, the method including the step of the activation section preventing execution of the assigned task based on the activation status.

M7. The method according to any of the preceding embodiments with the features of M3, the method including the step of the planner section determining the state of the apparatus based on the status of at least one control flow node.

M8. The method according to any of the preceding embodiments with the features of embodiment M3, wherein the planner section is a planner node.

M9. The method according to any of the preceding embodiments with the features of embodiment M2, wherein the behavior tree comprises a plurality of subtrees, each subtree comprising at least one control flow node and at least one execution node.

M10. The method according to any of the preceding embodiments with the features of embodiments M3 and M9, wherein the planner section is a planner subtree.

M11. The method according to any of the preceding embodiments with the features of embodiment M3, wherein the method comprises the control flow node called by the root node calling the planner section.

M12. The method according to any of the preceding embodiments with the features of embodiment M2, wherein the control flow node called by the root node is a sequence node.

M13. The method according to any of the preceding embodiments with the features of embodiment M11, wherein the planner section is called by the control flow node called by the root node before any other node is called by the control flow node called by the root node.

M14. The method according to any of the preceding embodiments with the features of embodiment M9, wherein the plurality of subtrees comprises at least one function subtree, wherein each function subtree comprises a function tree control flow node, an activation section comprising at least one node being a child node of the function tree control flow node, and a function section comprising at least one node being a child node of the function tree control flow node.

M15. The method according to the preceding embodiment, wherein, for each function subtree, the activation section is an activation node.

M16. The method according to any the 2 preceding embodiments, wherein, for each subtree, the function tree control flow node is a sequence node.

M17. The method according to any of the 3 preceding embodiments, wherein, for each subtree, the function section is a lower ranking child section of the function tree control flow node than the activation section.

M18. The method according to the any of the preceding embodiments with the features of embodiment M14, wherein the at least one function subtree is a plurality of function subtrees.

M19. The method according to any of the preceding embodiments with the features of embodiments M3 and M10, wherein the at least one activation section for which an activation status is set by the planner section is at least one activation section of the at least one function subtree.

M20. The method according to the preceding embodiment and with the features of embodiment M18, wherein the at least one activation section for which an activation status is set by the planner section is a plurality of activation sections of the plurality of subtrees, and preferably all activation sections of the plurality of subtrees.

M21. The method according to any of the preceding embodiments with the features of M14, wherein the apparatus comprises a hardware resource, the method including the step of the at least one function subtree manipulating the hardware resource when executed.

M22. The method according to the preceding embodiment, the method including the step of the function section of a subtree accessing the hardware resource and/or manipulating the hardware resource.

M23. The method according to any of the preceding embodiments with the features of M21, wherein the hardware resource is one of a motorized element configured to move the apparatus relative to its environment, a motorized element configured to manipulate an object separate from the apparatus, and a sensor element configured to capture the environment of the apparatus.

M24. The method according to any of the preceding embodiments with the features of M14, the method including the step of the function section of a subtree executing at least one of locating an object, manipulating the object, moving the object, gripping the object, navigating, repositioning, docking at a charging station, emergency stop.

M25. The method according to any of the preceding embodiments, wherein the behavior tree comprises a recovery plan section, the method including the step of the recovery plan section receiving and/or generating a recovery plan when called.

M26. The method according to the preceding embodiment, wherein the recovery plan section is a recovery plan node or subtree.

M27. The method according to any of the preceding embodiments with the features of M2, wherein the behavior tree comprises a sequence node and a selector node, wherein the selector node is a child node of the sequence node and the method includes the step of the sequence node calling the selector node last in the sequence of calling its child nodes.

M28. The method according to the preceding embodiment, wherein the behavior tree comprising a plan activation section wherein the plan activation section is a child section of the selector node, the method including the step of the selector node generating or receiving a plan step information representing a task or a next step of the current task of the apparatus.

M29. The method according to the preceding embodiment, the method including the step of the plan activation section calling the planner section at each instance the plan activation section is called, wherein the activation section is configured to compare a step received from the planner section to a previously planned step.

M30. The method according any of the preceding embodiments with the features of M28, wherein the behavior tree comprises a plan completion section, the method including the step of the plan completion section checking if the last step of the plan is executed and if the last step of the plan succeeded, wherein the plan completion section is disposed as a child node of the selector node and/or hierarchically parallel to the plan activation section.

M31. The method according to any of the previous embodiments with the features of M25, the behavior tree comprising a loop node, wherein the recovery plan section is provided as a child node hierarchically parallel to the loop node, wherein a subtree representing a current task of the apparatus is provided as a child node to the loop node.

M32. The method according to any of the previous embodiments with the features of M25, the method including the step of the recovery plan section executing a recovery sequence.

M33. The method according to any of the previous embodiments with the features of M25 and M31, the behavior tree comprising a recovery node, wherein the loop node and the recovery plan section are child sections of the recovery node, the method including the step of the recovery node calling the loop node and the recovery node calling the recovery plan section, when the loop node fails.

M34. The method according to any of the preceding embodiments, wherein the behavior tree comprises a parallel node, the method including the step of the parallel node calling its child nodes simultaneously.

M35. The method according to any of the preceding embodiments with the features of M34, the method including the step of the parallel node setting its result to failed when one of its child nodes fails and setting its result to succeeded when all child nodes succeed.

M36. The method according to any of the preceding embodiments with the features of embodiment M2, wherein the root node calling its child node comprises the root node calling its child node with a constant tick frequency, wherein the inverse of the tick frequency defines a constant tick interval.

M37. The method according to any of the preceding embodiments, wherein the step of using a behavior tree comprises an executor application executing the behavior tree.

M38. The method according to the preceding embodiments and with the features of the penultimate embodiment, wherein the method comprises a node providing a tick request to the executor application, in response thereto, the executor application causing the root node to call its child node at a time, wherein a time difference of this time minus the last previous time when the root node called its child node is smaller than the constant tick interval.

M39. The method according to any of the preceding embodiments with the features of embodiment M36, wherein the constant tick frequency is in the range of 0.1 Hz to 100 Hz, preferably 0.2 Hz to 10 Hz.

M40. The method according to any of the preceding embodiments with the features of M38, wherein the node provides a tick request to the executor application based on a status change of the node, a status change of one of its child nodes and/or a status change of a subtree disposed hierarchically below the node.

M41. The method according to any of the preceding embodiments with the features of M38, the method including the step of the executor application calling the root node independent of the constant tick interval upon receiving a tick request.

M42. The method according to any of the preceding embodiment with the features of embodiment M2, wherein each of a plurality of the nodes comprises at least one data element indicator indicating at least one data element related to the respective node.

M43. The method according to the preceding embodiment, wherein the at least one data element indicator comprises at least one required input value data indicator, wherein each required input value data indicator indicates a data element whose value is required to be passed to the respective node for execution of the respective node.

M44. The method according to any of the 2 preceding embodiments, wherein the at least one data element indicator comprises at least one required input reference data indicator, wherein each required input reference data indicator indicates a reference to a data element, which reference needs to be passed to the respective node for execution of the respective node.

M45. The method according to any of the 3 preceding embodiments, wherein the at least one data element indicator comprises at least one constant value data indicator, wherein each constant value data indicator indicates a data element whose value is constant at runtime and whose value is required to be passed to the respective node for execution of the respective node.

M46. The method according to any of the 4 preceding embodiments, wherein the at least one data element indicator comprises at least one changing value data indicator, wherein each changing value data indicator indicates a data element whose value is required to be updated whenever the respective node is called.

M47. The method according to any of the 5 preceding embodiments, wherein the at least one data element indicator comprises at least one optional input value data indicator, wherein each optional input value data indicator indicates a data element whose value is not required to be passed, but can be passed, to the respective node for execution of the respective node.

M48. The method according to any of the 6 preceding embodiments, wherein the at least one data element indicator comprises at least one output data indicator, wherein each output data indicator indicates a data element accessible by at least one node other than the node comprising the respective output data indicator.

M49. The method according to any of the preceding embodiments, wherein the apparatus moves freely in space.

M50. The method according to any of the preceding embodiments, wherein the apparatus is a robot.

Below, system embodiments will be discussed. These embodiments are abbreviated by the letter "S" followed by a number. Whenever reference is herein made to "system embodiments", these embodiments are meant.

S1. A system for controlling an apparatus, wherein the system comprises a processing module configured to use a behavior tree for tasks performed by the apparatus.

S2. The system in accordance with the preceding embodiment, wherein the behavior tree comprises nodes including a root node, at least one control flow node and at least one execution node and directed edges, wherein the nodes are connected with the directed edges, wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge, wherein the control flow nodes and the execution nodes are adapted to return different states to their parent's nodes, the states including success, running and failure, wherein the system is configured to perform a method including the steps of: the root node calling its child node, which is a control flow node; the root node's child node calling a first node; the first node returning a first state to the root node's child node; the root node's child node returning a second state to the root node.

S3. The system according to the preceding embodiment, wherein the behavior tree comprises a planner section, and wherein the processing module is configured to call the planner section when stepping through the behavior tree, wherein in response to being called, the planner section determines a state of the apparatus and sets an activation status of at least one activation section.

S4. The system according to the preceding embodiment, wherein the state of the apparatus comprises at least one of location information, relative position information of at least one motorized apparatus element, object information of at least one object the apparatus interacts with.

S5. The system according to any of the preceding system embodiments with the features of S3, wherein the processing module is configured to evaluate the activation status before executing the assigned task by executing the activation section.

S6. The system according to any of the preceding system embodiments with the features of S3, wherein the processing module is configured to prevent the execution of the assigned task based on the activation status by means of executing the activation section.

S7. The system according to any of the preceding system embodiments with the features of S3, wherein the processing module is configured to determine the state of the apparatus based on the status of at least one control flow node by means of executing the planner section.

S8. The system according to any of the preceding system embodiments with the features of embodiment S3, wherein the planner section is a planner node.

S9. The system according to any of the preceding system embodiments with the features of embodiment S2, wherein the behavior tree comprises a plurality of subtrees, each subtree comprising at least one control flow node and at least one execution node.

S10. The system according to any of the preceding system embodiments with the features of embodiments S3 and S9, wherein the planner section is a planner subtree.

S11. The system according to any of the preceding system embodiments with the features of embodiment S3, wherein the processing module is configured to call the planner section via calling the root node and subsequently calling the control flow node.

S12. The system according to any of the preceding system embodiments with the features of embodiment S2, wherein the control flow node called by the root node is a sequence node.

S13. The system according to any of the preceding system embodiments with the features of embodiment S11, wherein the processing module is configured to call the planner section via calling the root node and subsequently calling the control flow node before calling any other child nodes of the control flow node.

S14. The system according to any of the preceding system embodiments with the features of embodiment S9, wherein the plurality of subtrees comprises at least one function subtree, wherein each function subtree comprises a function tree control flow node, an activation section comprising at least one node being a child node of the function tree control flow node, and a function section comprising at least one node being a child node of the function tree control flow node.

S15. The system according to the preceding embodiment, wherein, for each function subtree, the activation section is an activation node.

S16. The system according to any the 2 preceding embodiments, wherein, for each subtree, the function tree control flow node is a sequence node.

S17. The system according to any of the 3 preceding embodiments, wherein, for each subtree, the function section is a lower ranking child section of the function tree control flow node than the activation section.

S18. The system according to the any of the preceding system embodiments with the features of embodiment S14, wherein the at least one function subtree is a plurality of function subtrees.

S19. The system according to any of the preceding system embodiments with the features of embodiments S3 and S10, wherein the at least one activation section for which an activation status is set by the planner section is at least one activation section of the at least one function subtree.

S20. The system according to the preceding embodiment and with the features of embodiment S18, wherein the at least one activation section for which an activation status is set by the planner section is a plurality of activation sections of the plurality of subtrees, and preferably all activation sections of the plurality of subtrees.

S21. The system according to any of the preceding system embodiments with the features of S14, comprising the apparatus, wherein the apparatus comprises a hardware resource, wherein the processing module is configured to manipulate the hardware resource via executing the at least one function subtree.

S22. The system according to the preceding embodiment, wherein the processing module is configured to access the hardware resource and/or manipulate the hardware resource via executing the function section of a subtree.

S23. The system according to any of the preceding system embodiments with the features of S21, wherein the hardware resource is one of a motorized element configured to move the apparatus relative to its environment, a motorized element configured to manipulate an object separate from the apparatus, and a sensor element configured to capture the environment of the apparatus.

S24. The system according to any of the preceding system embodiments with the features of S14, wherein the processing module is configured to execute at least one function of locating an object, manipulating the object, moving the object, gripping the object, navigating, repositioning, docking at a charging station, emergency stop via calling the function section of a subtree.

S25. The system according to any of the preceding system embodiments with the features of S5, wherein the behavior tree comprises a recovery plan section, wherein the processing module is configured to receive and/or generate a recovery plan via calling the recovery plan section.

S26. The system according to the preceding embodiment, wherein the recovery plan section is a recovery plan node.

S27. The system according to any of the preceding system embodiments with the features of S2, wherein the behavior tree comprises a sequence node and a selector node, wherein the selector node is a child node of the sequence node and the method includes the step of the sequence node calling the selector node last in the sequence of calling its child nodes.

S28. The system according to the preceding embodiment, comprising a plan activation section wherein the plan activation section is a child section of the selector node, wherein the processing module is configured to generate or receive a plan step information representing a task or a next step of the current task of the apparatus via calling the selector node.

S29. The system according to the preceding embodiment, wherein the plan activation section is configured to call the planner section at each instance the plan activation section is called, and wherein the activation section is configured to compare a step received from the planner section to a previously planned step.

S30. The system according any of the preceding system embodiments with the features of S28, wherein the behavior tree comprises a plan completion section, wherein the processing module is configured to check if the last step of the plan is executed and if the last step of the plan succeeded via calling the plan completion section, wherein the plan completion section is disposed as a child node of the selector node and/or hierarchically parallel to the plan activation section.

S31. The system according to any of the previous embodiments with the features of S25, wherein the behavior tree comprises a loop node, wherein the recovery plan section is provided as a child node hierarchically parallel to the loop node, wherein a subtree representing a current task of the apparatus is provided as a child node to the loop node.

S32. The system according to any of the previous embodiments with the features of S25, wherein the processing module is configured to execute a recovery sequence via calling the recovery plan section.

S33. The system according to any of the previous embodiments with the features of S25 and S31, wherein the behavior tree comprises a recovery node, wherein the loop node and the recovery plan section are child sections of the recovery node, wherein the processing module is configured to call the loop node via calling the recovery node and to call the recovery plan section via the recovery node, when the loop node fails.

S34. The system according to any of the preceding system embodiments with the features of S5, wherein the behavior tree comprises a parallel node configured to call its child nodes simultaneously.

S35. The system according to any of the preceding system embodiments with the features of S34, wherein the parallel node is configured to set its result to failed when one of its child nodes fails and to set its result to succeeded when all child nodes succeed.

S36. The system according to any of the preceding system embodiments with the features of embodiment S2, wherein the root node is configured to call its child nodes with a constant tick frequency, wherein the inverse of the tick frequency defines a constant tick interval.

S37. The system according to any of the preceding system embodiments, wherein the processing module is configured to execute an executor application configured to step through the behavior tree.

S38. The system according to the preceding embodiments and with the features of the penultimate embodiment, wherein the behavior tree comprises a node configured to provide a tick request to the executor application, wherein in response thereto the executor application is configured to trigger the root node to call its child node at a time, wherein a time difference of this time minus the last previous time when the root node called its child node is smaller than the constant tick interval.

S39. The system according to any of the preceding system embodiments with the features of embodiment S36, wherein the constant tick frequency is in the range of 0.1 Hz to 100 Hz, preferably 0.2 Hz to 10 Hz.

S40. The system according to any of the preceding system embodiments with the features of S38, wherein the node provides a tick request to the executor application based on a status change of the node, a status change of one of its child nodes and/or a status change of a subtree disposed hierarchically below the node.

S41. The system according to any of the preceding system embodiments with the features of S38, wherein the executor application is configured to call the root node independent of the constant tick interval upon receiving a tick request.

S42. The system according to any of the preceding embodiment with the features of embodiment S2, wherein each of a plurality of the nodes comprises at least one data element indicator indicating at least one data element related to the respective node.

S43. The system according to the preceding embodiment, wherein the at least one data element indicator comprises at least one required input value data indicator, wherein each required input value data indicator indicates a data element whose value is required to be passed to the respective node for execution of the respective node.

S44. The system according to any of the 2 preceding embodiments, wherein the at least one data element indicator comprises at least one required input reference data indicator, wherein each required input reference data indicator indicates a reference to a data element, which reference needs to be passed to the respective node for execution of the respective node.

S45. The system according to any of the 3 preceding embodiments, wherein the at least one data element indicator comprises at least one constant value data indicator, wherein each constant value data indicator indicates a data element whose value is constant at runtime and whose value is required to be passed to the respective node for execution of the respective node.

S46. The system according to any of the 4 preceding embodiments, wherein the at least one data element indicator comprises at least one changing value data indicator, wherein each changing value data indicator indicates a data element whose value is required to be updated whenever the respective node is called.

S47. The system according to any of the 5 preceding embodiments, wherein the at least one data element indicator comprises at least one optional input value data indicator, wherein each optional input value data indicator indicates a data element whose value is not required to be passed, but is optionally passed, to the respective node for execution of the respective node.

S48. The system according to any of the 6 preceding embodiments, wherein the at least one data element indicator comprises at least one output data indicator, wherein each output data indicator indicates a data element accessible by at least one node other than the node comprising the respective output data indicator.

S49. The system according to any of the preceding system embodiments with the features of S21, wherein the apparatus is configured to move freely in space.

S50. The system according to any of the preceding system embodiments, wherein the apparatus is a robot.

S51. The system according to any of the preceding system embodiments, wherein the system is configured to perform the method according to any of the preceding method embodiments.

T1. A software product, configured to perform the method according to any of the preceding method embodiments.

T2. The software product according to the preceding embodiment, wherein the software product is configured to perform the method according to any of the preceding method embodiments, when run on an assembly comprising a data processing system and the apparatus.

FIG. 1 schematically depicts an embodiment of a behavior tree 100. The behavior tree 100 comprises a root node 101, which is the initial node to be called to traverse the behavior tree 100. The root node 101 can call a first sequence node 102, which is a child node to the root node 101, the first sequence node 102 being configured to sequentially call its child nodes 104, 106. The behavior tree 100 can comprise a planner section 103, more specifically a planner node 104, which can be the first child node of the first sequence node 102.

The planner section 103 can acquire a state of the apparatus, wherein the state of the apparatus is typically based on an environment of the apparatus, and/or on an execution state of the apparatus. For example, the apparatus may be a robot configured to pick up and transport items. Such an apparatus may have different execution states. For example, in one operation state, the apparatus (i.e., the robot) may have a gripper unit inactive and may simply travel from a location A to a location B. Further, in another operation state, the robot may already be at the right location (i.e., travelling may not be necessary), but the robot may be in the process of picking up an object. As regards the environment of the apparatus, e.g., the apparatus may recently have detected a moving object (which may be a human), or may not have detected such a moving object recently. E.g., depending on the environment and/or on the operation state of the robot, a plan of operation of the apparatus may depend, and thus, a plan may be generated in the planner section 103, which—in the embodiment depicted in FIG. 1—is a planner node 104, but may also be realized differently (e.g., as a subtree comprising a plurality of nodes).

Based on the state of the apparatus, the planner section 103 may set an activation status of subtrees. With particular reference to, e.g., FIG. 1, the behavior tree comprises functional subtrees 114-1 to 114-6. In the depicted embodiment, each of these subtrees 114-1 to 114-6 comprises an activation section 113, respectively. For example, subtree 114-1 comprises an activation section 113-1. In the depicted embodiment, the functional subtree 114-1 relates to the function of the apparatus (e.g., robot) finding an item to be picked up. For example, when the robot travels from a first location to a second location (where the item is to be picked up), this functionality may be omitted (e.g., as the approximate location of the item to be picked up may be stored in a database). However, once the robot is in the approximate location where the item to be picked up is located, it may be desirable to find the concrete item to be picked up, to localize it and to then pick it up with a gripper. Thus, in the first state (robot travelling to approximate location of the item), it may be advantageous not to actually fully execute the functional subtree relating to finding the item, while in the second state (robot intending to pick up the item), it may be desirable to execute the functional subtree relating to finding the item.

More particularly, in embodiments, the planner section 103 may thus set the activation status of the subtree by setting the activation section 113. When the activation section 113 is activated, the subtree may be executed. When the activation section 113 is de-activated, the subtree may not be executed. More particularly, the subtree 114-1 comprises a sequence node 115-1 and the activation section 113 may be the highest-ranking child of this sequence node 115-1. The subtree 114-1 further comprises an additional function section 116-1 as a further child of the sequence node 115-1, wherein this function section 116-1 is lower ranking than the activation section 113. Thus, when setting the activation section 113-1 to active (i.e., "success"), the behavior tree will traverse the subtree 114-1, section 113-1 will return "success" and the further functional section 116-1 will thus be traversed (i.e., the respective functionality will be executed). However, when setting the activation section 113-1 to inactive (i.e., "failure"), the subtree 114-1 stops execution after calling the activation section 113-1, i.e., the other child (or children) of the sequence node 115-1 are not called. Thus, the execution of the subtrees may be controlled by means of such an activation section.

Again, the planner section 103 may determine a state of the apparatus, and may in response thereto set the activation states of subtrees, e.g., by setting the status of a relatively high-ranking activation section 113-*n* in the respective subtrees. Thus, subtrees may be activated or de-activated.

This may increase the operational efficiency, as only those functional subtrees may be executed in their entirety which are needed based on the current operational state of the apparatus.

Furthermore, a recovery node 106 can be disposed parallel to the planner section 103. The first sequence node 102 can be configured to call the recovery node 106 after calling the planner section 103, respectively the planner node 104. In particular, the recovery node 106 can be called once the planner section 103 succeeded.

The recovery node 106 can have at least two child nodes linked to it. The recovery node 106 can be a sequence node configured to call its child nodes in a predefined sequence. Specifically, the recovery node 106 can have a loop node 105 linked to it as a first child node and a recovery plan section 107 linked to it as a second child node. The recovery plan section 107 can be a subtree or a single node configured to modify a subtree disposed hierarchically downstream of the loop node 105. Thereby, the recovery plan section 107 can alter the behavior tree 100 to mitigate a failure of the loop node 105. The loop node 105 may fail, for example, when the main task constituted by a plurality of function subtrees fails due to an irrecoverable error in the currently running function subtrees attached either directly to the loop node 105 or attached via proxy nodes downstream of the loop node 105. The alteration to the behavior tree 100 may still require the original main task to succeed, however, the function subtrees or their relative configuration to one another can be changed in such a way that the order or type of actions to be executed is modified.

The recovery node 106 can be configured to call the loop node 105 first. The loop node 105 can be configured to execute its at least one child node in a loop as long as it succeeds. The number of iterations can be limited. The loop node 105 can be configured to fail if the at least one child node fails once. In the case of a limited number of iterations, the loop node 105 is configured to succeed when the child node has succeeded in every iteration.

The behavior tree 100 can comprise a further sequence node 108 which is linked to the loop node as a child node. The further sequence node 108 can be configured to call its child nodes in a predetermined sequence, in particular calling from top to bottom according to the orientation of the schematic.

Furthermore, the behavior tree 100 can comprise a selector node 109, which is linked to the further sequence node 108 as a child node. The further sequence node 108 can be configured to call the selector node 109 last.

Additionally, the behavior tree 100 can comprise a plan activation section 110 and/or a plan completion section 111 which can be linked to the selector node 109 as child nodes. The plan activation section 110 can be configured to acquire a new step to be executed of a plan describing a task the apparatus is tasked with.

The plan completion node 111 can be configured to succeed when the task to be completed by the current traversing through the behavior tree 100 is completed and/or no further plan steps are to be executed. The selector node 109 in turn succeeds and thereby signal the loop node 105 by proxy of the further sequence node 108 that the task is complete. A task can complete by either succeeding or failing. A failed task may trigger a call of the recovery plan section 107.

According to an embodiment, the behavior tree 100 comprises at least one parallel node 117. The parallel node 117 can be disposed parallel to the selector node 109 and called before the selector node 109 is called or disposed hierarchically below a further node parallel to selector node 109. The parallel node 117 can be configured to call its child nodes in such a way that the child nodes execute their associated task simultaneously to each other. When the parallel node calls its child nodes, at least two child nodes of the parallel node 117 may be in the state RUNNING.

The behavior tree 100 can comprise at least a further selector node 112. Specifically, the behavior tree 100 can comprise a further selector node 112-1, to which function subtrees pertaining to a specific first apparatus resource are connected. Therefore, this further selector node 112-1 is also called a first resource node 112-1. Furthermore, the behavior tree 100 can comprise a further selector node 112-2, to which function subtrees pertaining to a specific second apparatus resource are connected. This further selector node 112-2 can also be called a second resource node 112-2. The resource nodes 112-1, 112-2, can be realized as selector nodes. The selector nodes 112-1, 112-2 may always start with calling their respective designated first child node. If a ticked child node returns RUNNING, the respective parent resource node 112-1, 112-2 can also return RUNNING. If one child node returns SUCCESS, the respective resource node 112-1, 112-2 succeeds as well and does not execute any further child nodes. If all child nodes return FAILURE, the resource node 112-1, 112-2 can also return FAILURE. The selector composite may usually be used to rank tasks, respectively functions by their priority, with the first child node having the highest priority. Each child node may check its applicability conditions, such that higher-priority child nodes will automatically become active at the next iteration and may override or cancel the execution of lower priority child nodes. Generally, it will be understood that the selector node 112-1 will execute the first of its child nodes that does not fail. Thus, by using the described architecture and the activation sections 113, all the subtrees that are de-activated will fail immediately after being called, so that when executing the behavior tree, the activated subtrees can immediately be executed.

That is, the behavior tree 100 can comprise a plurality of function subtrees 114-1-114-6 with respective function tree control flow nodes 115-1-115-6, wherein these function tree control flow nodes 115-1-115-6 are the first nodes to be called, when the respective function subtree 114-1-114-6 is executed. Each function subtree can comprise a respective function section 116-1-116-6. A function section can comprise instructions to manipulate the respective hardware resource to achieve the task associated with the function subtree. These instructions can be executed when the function section 116-1-116-6 is called. Further, a function subtree 114 can comprise an activation section 113, as discussed.

As discussed, in an embodiment, a status of activation sections 113 pertaining to the function subtrees 114 available via the resource nodes 112 may be set by means of the planner section 103.

The first resource node 112-1 and the second resource node 112-2 can be connected as child nodes to the parallel node 117. The first resource node 112-1 can be the first node of a subtree, which groups all functions pertaining to a first apparatus resource. The first apparatus resource can be a motorized control arm of the apparatus. Thus, all functions which access the first apparatus resource may be represented as function sections of the subtree attached to the first resource node 112-1. A function subtree 114 can comprise a function tree control flow node 115 with an activation section 113 as a first child node and a function section 116 as a second child node.

According to an, function sections 116-1-116-3 regarding the first resource, i.e., a motorized control arm, can pertain to the task of finding an object, respectively item to pick up, the task of picking up the object and the task of placing the object in a backpack, wherein the backpack can be a storage space of the apparatus. Furthermore, a null function node 118-1 can be linked to the first resource node 112-1, wherein the null function node 118-1 is called last, i.e., when none of the previous functions subtrees 114-1-114-3 succeeded or none of the previous function subtrees 114-1-114-3 is to be executed.

According to an embodiment, function sections 116-4-116-6 regarding the second resource, i.e., a motorized translation base, can pertain to the task of navigating, the task of repositioning and/or the task of docking to charge. Furthermore, a further null function node 118-2 can be linked to the second resource node 112-2, wherein the further null function node 118-1 is called last, i.e., when none of the previous function subtrees 114-4-114-6 succeeded or none of the previous function subtrees 114-4-114-6 is to be executed.

Figure 2:
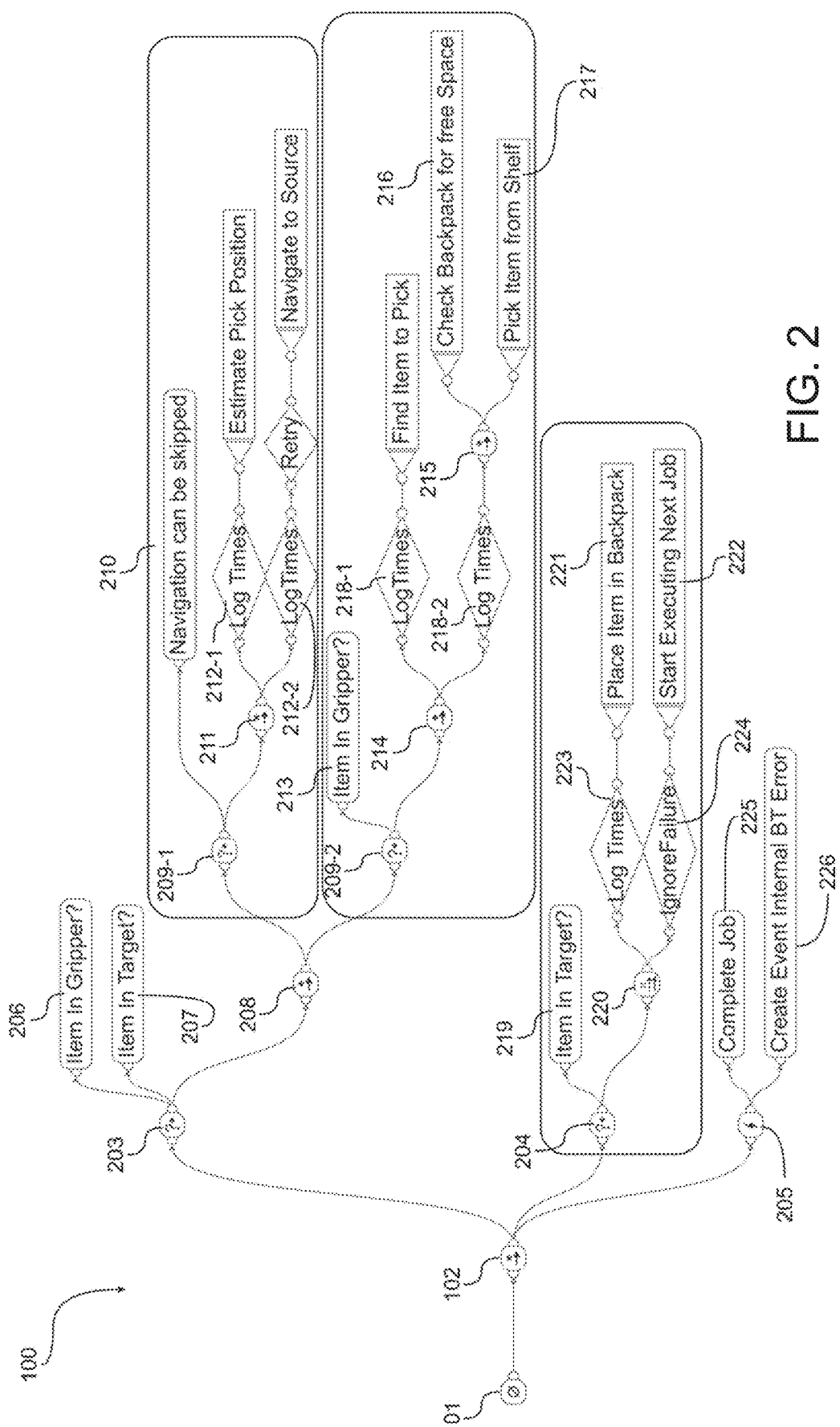
FIG. 2 schematically depicts an embodiment of a behavior tree according to features described herein.

FIG. 2 depicts further embodiments. The behavior tree 100 comprises a root node 101, which is the initial node to be called to traverse the behavior tree 100. The behavior tree 100 can further comprise a first control flow node, in particular a first sequence node 102, wherein the root node 101 is configured to call the first sequence node 102, which is a child node to the root node 101.

The behavior tree 100 can comprise a further control flow node, in particular a first selector node 203, which can be configured to have a plurality of child nodes 206, 207, 208 attached to it. The behavior tree 100 can comprise a first conditional node 206 and a second conditional node 207, which are children of the first selector node 203. The conditional nodes 206, 207 can be configured to evaluate a condition when called. For example, the first conditional node 206 can be configured to determine whether an item is in a gripper. The gripper can be a physical resource of an apparatus, specifically a robot, configured to grip items. Furthermore, the second conditional node 207 can be configured to determine whether an item is in its target, in particular its target location. The item can be a physical object separate from the apparatus, specifically an item to be located and/or picked up. Thus, when the first selector node 203 is called at least one condition can be evaluated prior to calling a further sequence node 208 (which is a further child node of the first selector node 203) to execute a function.

The behavior tree 100 can comprise a further sequence node 208, wherein two function subtrees are attached to the further sequence node 208 via further selector nodes 209-1 and 209-2. The further sequence node 208 can be configured to sequentially call its child nodes, beginning with a first function selector node 209-1 and continuing with a second function selector node 209-2. Thereby, a first function subtree can be executed and after completing the first function subtree, a further function subtree can be executed by calling the second function selector node 209-2.

The first function selector node 209-1 can be the first node of a function subtree pertaining to the navigation of the apparatus, in particular the navigation of a robot in a known environment, i.e., a warehouse. A first child node 210 of the first function selector node 209-1 can be configured to determine whether the apparatus should initiate a navigation. The navigation can be executed by calling the second child node 211 of the first function selector node 209-1. The node 211 can be a sequence node. A function subtree attached to the node 211 can be configured to estimate the position of an item to be picked up as a first step and to navigate to the estimated position of the item to be picked up as a second step.

The navigation can be retried for a number of iterations. Chronical data can be logged for the first step and the second step, in particular logged individually by dedicated logging nodes 212-1 and 212-2.

The second function selector node 209-2 can be the first node of a function subtree pertaining to the function of picking up an item, more generally of a function pertaining to a separate resource of the apparatus, in particular separate from navigational resources.

A first child node 213 of the second function selector node 209-2 can be configured to determine whether an item is gripped, respectively an item is positioned in the gripper. The gripper can be a general item handling resource of the apparatus. The gripping of an item can be executed by calling the second child node 214 of the second function selector node 209-2. The node 214 can be a sequence node. A function subtree attached to the node 214 can be configured to find the item to be picked up as a first step and to pick the item up using the gripper as a second step. The step of picking up the item can further be split by a sequence node 215, wherein in a first child node 216 of the sequence node can be configured to determine whether the apparatus is able to pick up the item by checking if there is space for the item to be placed in a backpack of the apparatus. The backpack can be a storage space attached to the apparatus. The node 216 can be an execution node configured to determine if the item to be pick-up or already picked-up can fit in the backpack. This may include calculating the remaining volume of the backpack, calculating the volume of the item, comparing at least one dimension of the item with at least one dimension of the backpack and/or considering the dimensions of items already in the backpack. A second child node 2017 of the sequence node 215 can be a further execution node configured to execute the task of picking up the item from its estimated position, i.e., the position of the item on a storage shelf.

Chronical data can be logged for the first step and the second step, in particular logged individually by dedicated logging nodes 218-1 and 218-2.

Once the function subtrees are completed, meaning they either failed or succeeded and reported that status to the parent node, specifically the further sequence node 208, then to the first selector node 203 and/or then to the first sequence node 102, the first sequence node 102 can continue by calling its next child node according to its predetermined sequence.

Specifically, the behavior tree 100 can comprise a further control flow node, in particular a second selector node 204, which is the second child node of the first sequence node 102 to be called after the first selector node 203. The second selector node 204 can be a first node of a subtree pertaining to completing the current task, i.e. carrying out the last action required to complete the current task and/or initiating the start of the next task, respectively job. A task or job can be defined as an overall goal to be achieved by the apparatus, wherein a specific sequence of actions, in particular actions codified by the behavior tree and performed by the apparatus can complete the task.

The second selector node 204 can have a further conditional node 219 and a parallel node 220 attached sequentially as child nodes. The further conditional node 219 can be configured to evaluate a condition when called. For example, the further conditional node 219 can be configured to determine whether an item is at its target location. The target location can be the backpack of the apparatus or any other destination for the item, i.e., a conveyor belt, another shelf place, a backpack of another robot.

Furthermore, the parallel node 220 can be configured to run two tasks, meaning two function subtrees or nodes in parallel. A first execution node 221 can be linked to the parallel node 220, in particular via a further logging node 223 configured to log chronical data pertaining to the execution of the task assigned to the execution node 221. The first execution node 221 can be configured to execute the task of placing the item in the backpack.

A further execution node 222 can be linked to the parallel node 220, wherein the parallel node 220 is configured to at least partially execute the first execution node 221 and the second execution node 222 in parallel. A partially parallel execution can be defined as the execution nodes 221, 222 being in the state RUNNING for a time interval. More specifically, the parallel node 220 is configured to call the first execution node 221 via proxy of the further logging node 223 and to call the second execution node 222 via proxy of an Ignore-Failure-node 224. The Ignore-Failure-node 224 can be configured to return SUCCESS when its child node, respectively the second execution node 222, returns SUCCESS or FAILURE, and return RUNNING when its child node returns RUNNING.

The behavior tree 100 can further comprise a failure node 205 which is a child node of the first sequence node 102. The first sequence node 102 can be configured to call the failure node 205 last in a sequence of nodes 203, 204, 205 called by the first sequence node 102.

The failure node 205 can have two child nodes 225, 226. The node 225 can be configured to execute the task dedicated to complete the assigned plan. Preferably, the node 225 is configured to generate an indicator signal to provide information regarding the completion of the currently assigned job, respectively task by the apparatus. The node 225 can be configured to generate a marking in a database as the indicator signal, wherein the database can be accessible by further apparatuses so as to indicate that the job is complete to these further apparatuses. The indicator signal can comprise a time information indicating the time of completion of the job. The marking in the database can be achieved by modifying a database element, generating a new database element and/or setting a value of a database element.

The node 226 can be configured to create an event signaling the failure of the currently traversed behavior tree. In particular, the node 226 can be called as a last option, more specifically as the last node being called before the current task will fail completely and the first sequence node 102 would return FAILURE.

The node 226 can be configured to generate a failure message or a failure event which can be evaluated by the apparatus, in particular be evaluated by systems outside the currently traversed behavior tree 100.

Figure 3:
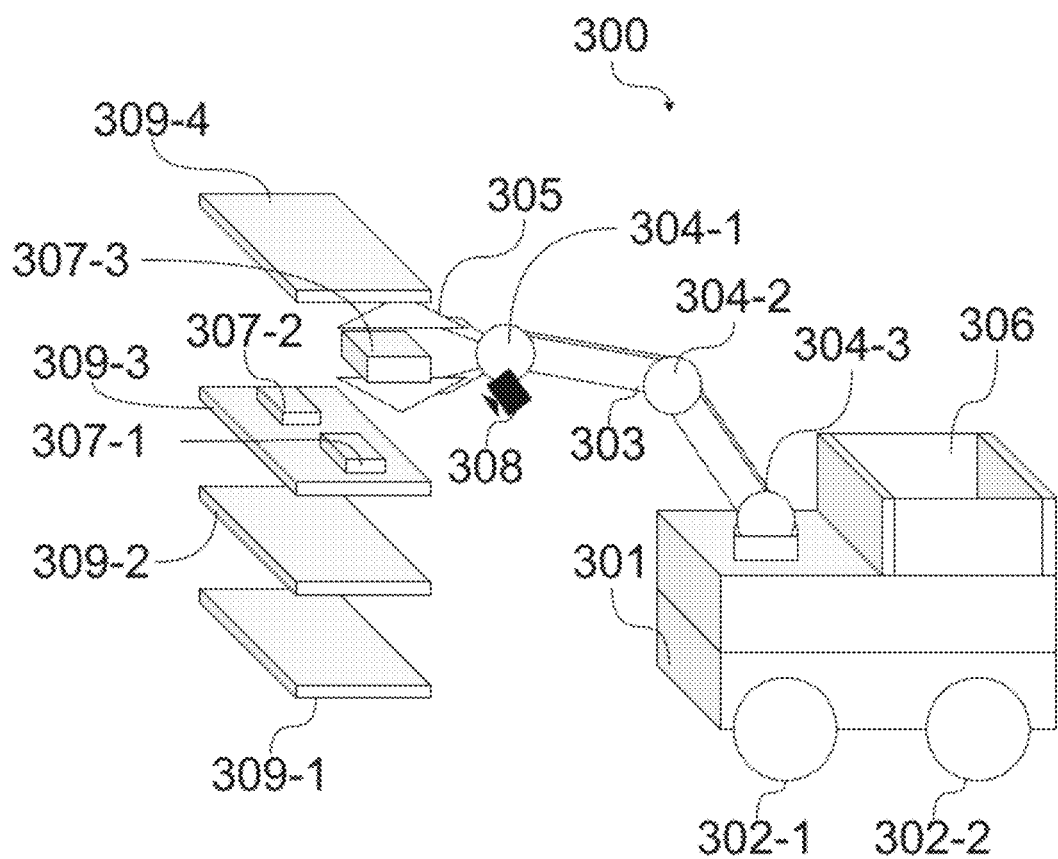
FIG. 3 schematically depicts an embodiment of an apparatus according to features described herein.

FIG. 3 schematically depicts an embodiment of an apparatus 300. The apparatus 300 can be a robot. The robot 300 can comprise a motorized base unit 301. The motorized base unit 301 can be configured to execute a translational movement of the robot 300 with respect to its environment. Specifically, the motorized base unit 301 can move the robot 300 on a floor. The motorized base unit 301 may comprise a plurality wheels, rollers, cart wheels, chain tracks and/or omnidirectional wheels. The schematic drawing only depicts two wheels 302-1, 302-2, while it should be understood that the embodiment depicted in FIG. 3 would usually comprise 4 wheels (although other configurations are also possible).

On the motorized base unit 301, a pick-up means 303 is located. In the depicted embodiment, the pick-up means 303 is a grappler having one or more joints 304-1, 304-2, 304-3. At the end of pick-up means 303, there is provided a gripping tool 305 adapted to grip or pick-up objects.

Furthermore, at the end of the pick-up means 303, there is also provided a camera 308. On top of the base 301, there may be a space 306 to place objects, e.g., objects 307-1 to 307-3.

The robot 300 may be an autonomously driven and executed robot 300. The robot 300 may in particular be used in a warehouse to pick up goods, e.g., objects 307-1 to 307-2 and to bring the objects 307-1 to 307-3 to a desired location. The robot 300 may be configured to execute a task structured by a behavior tree. For example, the robot 300 may locate an object 307-1-307-3, navigate to the object 307-1-307-3, position its pick-up means 303, respectively its gripper 305 relative to the object 307-1-307-3, grip the object 307-1-307-3, place the object 307-1-307-3 in the space 306, navigate to a destination, continue to pick-up further objects and/or navigate to a charging station. Each of the above actions may be carried out in any order and repeated as desired. Moreover, the objects 307-1-307-3 may be placed on shelves 309-1-309-4.

Again, with primary reference to FIG. 1 (although it will be understood that the concepts described below may also be used in conjunction with the embodiment depicted in FIG. 2), the root node 101 typically calls its child node 102 with a tick frequency, and the behavior tree 100 is then traversed with this constant tick frequency. For example, the constant tick frequency may be in the range of 0.1 Hz to 100 Hz, and more particularly it may be 1 Hz. That is, the behavior tree 100 is traversed once per second.

Such a constant tick frequency of 1 Hz may be relatively low compared to behavior trees that have previously been described in conjunction with operation a technical apparatus, such as a robot 300. Furthermore, it is noted that different functionalities of the apparatus may ideally be executed with different frequencies. For example, when the robot intends to dock to a charger (see 116-6), it may not be important that this is performed very quickly. However, for example, an emergency brake functionality employed when a human is sensed in the vicinity of a moving robot (this functionality is not depicted in FIG. 1) may advantageously be operated faster, and ideally faster than the time scale corresponding to the constant tick frequency, which time scale would be 1 s in case of a tick frequency of 1 Hz.

Furthermore, it will be understood that the behavior tree 100 may typically be executed by an executor application.

Thus, in embodiments of the present technology, it may also be possible that a node of the behavior tree provides a tick request to the executor application and the executor application causes the root node to call its child node "immediately" afterwards.

For example, consider that in the normal operation (with a tick frequency of 1 Hz), the root node ticks its child node at times of 0.00 s, 1.00 s, 2.00 s, 3.00 s, etc.

It may then be possible that, e.g., at time 2.23 s, a node senses a human in the vicinity of the robot which is moving. In response thereto, the node may send a tick request to the executor application, e.g., at time 2.29 s, and the executor application may cause the root node to tick its child node, such that this ticking occurs at time 2.31 s. Thus, the behavior tree 100 will be traversed again 0.31 s after it has last been traversed.

Thus, the present technology may allow to be very responsive, i.e., reacting fast to changing conditions. At the same time, under normal operation conditions, the behavior tree may operate at a relatively low frequency, thereby saving energy.

This may be advantageous vis-à-vis approaches where the behavior tree is only traversed with a constant frequency. In such scenarios, the operation of the behavior tree is either not responsive (leading to below optimal performance), or the frequency is relatively high. In particular, in such approaches, the frequency would normally be set in view of the functionality requiring the highest frequency. However, even in situations when such a high frequency functionality is not executed, the behavior tree would normally be executed with the high frequency, leading to an overly high energy expenditure. This can be overcome by the described embodiment.

Furthermore, and also with primary reference to FIG. 1 (although it is again noted that the concept now described may also be used in conjunction with the embodiment depicted in FIG. 2), it will generally be understood that the behavior tree 100 depicts the control flow. However, this is relatively independent from the "data flow", i.e., from the assessment of which sections of the behavior tree have access to which data elements.

Thus, in embodiments of the present technology, each node comprises a data element indicator. The data element indicator indicates at least one data element that is related to the respective node.

The data element indicators may be realized as follows.

The data element indicators may comprise required input data indicators. Such a required input data indicator indicates a data element whose value is required to be passed to the respective node for execution of the respective node. For example, consider the node 116-4 in FIG. 1 relating to navigation of the robot. Such a node may require as a data element the location of the target of the navigation, such that this data element (target in space) would be a required data input element, which would be indicated by a required input data indicator.

The data element indicators may comprise required input reference data indicator. The required input reference data indicators may indicate references to data elements, which references are passed to the respective node for execution of the respective node. This may generally be similar to the required input data indicators. However, instead of requiring the actual data element to be passed to the node for its execution, a reference may be passed. In particular, this may be used, e.g., in case the corresponding data element has a relatively large size and it would thus require a long time to pass the actual data to the respective node. For example, reference is again made to the navigation node 116-4 in FIG. 1. When a robot is operating in a warehouse and wishes to navigate to a target location, it may require access to a map representative of the warehouse. However, such a map may have a relatively large size as regards its data. Thus, the respective node 116-4 may have a data indicator being a required input reference indicator, i.e., the data indicator may indicate that a reference to a respective map of the warehouse is required for operation of the respective node.

The data element indicators may comprise constant value data indicators. The constant value data indicator may indicate a data element whose value is constant at runtime and whose value is required to be passed to the respective node for execution of the respective node. Again, with respect to the navigation node 116-4, an example for a constant value data indicator may be an indication of a warehouse. Consider, e.g., an implementation where a robot may be operated in different warehouses, e.g., in warehouses A, B, C, D, E, F, G, and H. However, in one operation cycle, the robot would typically only be operated in one warehouse. Thus, the navigation node 116-4 may require as an input a constant value for the warehouse, and this may be indicated by a constant value data indicator.

The data element indicators may comprise changing value data indicators, wherein each changing value data indicator indicates a data element whose value is required to be updated whenever the respective node is called. Again, exemplary reference is made of the navigation node 116-4. An example for a changing value data indicator may be the position of the robot. It will be understood that for the navigation of the robot, it is usually required to have access to the position of the robot and that this position will constantly change when the robot is moving. Thus, the current position of the robot may be indicated by a changing value data indicator. In this regard, it is noted that such changing value data indicators are changed whenever the respective node is called (and not only when the respective node changes its status). Furthermore, it is also noted that a changing value data indicator may refer both to input and to output values. With further reference to the described example, the current position of the robot may not only be used for the navigation node 116-4, but also by other nodes, e.g., by the node 116-5 relating to a repositioning of the robot, and that for all such nodes, it may be advantageous to have access to data element that is regularly updated (and not only when a respective node has succeeded).

The data element indicators may comprise optional input value data indicators, wherein each optional input value data indicator indicates a data element whose value is not required to be passed, but can be passed, to the respective node for execution of the respective node. Again, with reference to the navigate node 116-4, consider the situation of a robot operating in a warehouse where also other robots may be present. An optional input value may be the location of other robots in the warehouse. If such data is provided to the navigation node 116-4, it may take these locations of the other robots into account when calculating the path from the robot's current location to its target location. However, when no information is provided in this regard, the node 116-4 may operate in a default state by disregarding other robots and by simply calculating the fastest route without taking into consideration potential delays by conflicting routes of robots. Thus, such an information may be indicated by an optional input value data indicator. It will be understood that for such data, the node will typically such data into account (when such data is provided), however, the node can also be operated without being provided with such data.

The data element indicators may comprise output data indicator, wherein each output data indicator indicates a data element accessible by at least one node other than the node comprising the respective output data indicator. Again, with reference to navigation node 116-4, the navigation node 116-4 may, e.g., track a distance travelled by the robot due to the navigation of the robot. Such a data point may be output and used by other nodes, e.g., by nodes estimating the remaining operation energy before the robot has to be charged again.

Reference numbers and letters appearing between parentheses in the claims, identifying features described in the embodiments and illustrated in the accompanying drawings, are provided as an aid to the reader as an exemplification of the matter claimed. The inclusion of such reference numbers and letters is not to be interpreted as placing any limitations on the scope of the claims.

The term "at least one of a first option and a second option" is intended to mean the first option or the second option or the first option and the second option.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

What is claimed is:

1. A method for controlling an apparatus, wherein the apparatus is a robot, the method comprising:
using a behavior tree for tasks performed by the apparatus,
wherein the behavior tree comprises nodes including a root node, at least one control flow node and at least one execution node and directed edges,
wherein the nodes are connected with the directed edges,
wherein the root node has one outgoing edge and no incoming edge, each control flow node has one incoming edge and at least one outgoing edge, and each execution node has one incoming edge and no outgoing edge,
wherein a node having an outgoing edge is defined as a parent node in relation to another node connected to this edge, and a node having an incoming edge is defined as a child node in relation to another node connected to this edge, and
wherein the at least one control flow nodes and the at least one execution nodes are adapted to return different states to their parent nodes, the states including success, running, and failure;
wherein the method further comprises:
the root node calling its child node, which is a control flow node;
the root node's child node calling a first node;
the first node returning a first state to the root node's child node; and
the root node's child node returning a second state to the root node;
wherein the behavior tree comprises a planner section, wherein the planner section is a child section of a node of the behavior tree;
wherein the behavior tree comprises function subtrees for manipulating at least one respective hardware resource of the apparatus wherein each function subtree comprises a respective activation node and a respective function section, wherein each activation node is configured to be set by the planner section in an active state or in an inactive state;
wherein the method further comprises:
calling the planner section;
in response to being called, determining, by the planner section, a state of the apparatus and setting, by the planner section and based on the determination of the state of the apparatus, at least one activation node in the active state or in the inactive state, wherein the planner section is distinct from each of the function subtrees;
calling the function subtrees;
in response to being called, each function subtree calling the respective function section if the respective activation node is set to the active state and determining not to call the respective function section if the respective activation node is set to the inactive state;
calling, via a loop node, a plan activation section; and
in response to being called, the plan activation section sequentially requesting a new step or task by calling the planner section after a previous step or task completes;
wherein the behavior tree comprises the loop node, and
wherein the plan activation section is arranged in the behavior tree such that the plan activation section is called via the loop node.

2. The method according to claim 1, the method comprising each function subtree evaluating a state of the respective activation node before executing an assigned task.

3. The method according to claim 1, wherein the behavior tree comprises a plurality of subtrees, each subtree comprising at least one control flow node and at least one execution node,
wherein the plurality of subtrees comprises the function subtree,
wherein each function subtree comprises:
a respective function tree control flow node,
and wherein for each function subtree:
the respective activation node is a child node of the respective function tree control flow node, and
the respective function section comprises at least one node being a child node of the respective function tree control flow node.

4. The method according to claim 3, wherein the apparatus comprises a hardware resource, the method including:
the step of the at least one function subtree manipulating the hardware resource when executed, and
the step of the function section of a subtree accessing the hardware resource and/or manipulating the hardware resource.

5. The method according to claim 3, wherein the apparatus comprises a hardware resource and the method includes the step of the at least one function subtree manipulating the hardware resource when executed.

6. The method according to claim 3, wherein the method includes the step of the function section of a subtree executing at least one of locating an object, manipulating the object, moving the object, gripping the object, navigating, repositioning, docking at a charging station, or emergency stop.

7. The method according to claim 1, wherein the behavior tree comprises a recovery plan section, the method including the step of the recovery plan section receiving and/or generating a recovery plan when called.

8. The method according to claim 7, wherein the behavior tree comprises a sequence node and a selector node, wherein the selector node is a child node of the sequence node and the method includes:
the step of the sequence node calling the selector node last in the sequence of calling its child nodes, wherein the plan activation section is a child section of the selector node, and
the step of the selector node generating or receiving a plan step information representing a task or a next step of a current task of the apparatus.

9. The method according to claim 8, wherein the method includes the step of the plan activation section calling the planner section at each instance the plan activation section is called, wherein the plan activation section is configured to compare a step received from the planner section to a previously planned step.

10. The method according to claim 8, wherein the behavior tree comprises a plan completion section and the method includes the step of the plan completion section checking if the last step of the plan is executed and if the last step of the plan succeeded, wherein the plan completion section is disposed as a child node of the selector node and/or hierarchically parallel to the plan activation section.

11. The method according to claim 8, wherein the recovery plan section is provided as a child node hierarchically parallel to the loop node, wherein a subtree representing a current task of the apparatus is provided as a child node to the loop node,
wherein the method includes the step of the recovery plan section executing a recovery sequence,
wherein the behavior tree comprises a recovery node, wherein the loop node and the recovery plan section are child sections of the recovery node, and
wherein the method includes the step of the recovery node calling the loop node and the recovery node calling the recovery plan section, when the loop node fails.

12. The method according to claim 1, wherein the root node calling its child node comprises the root node calling its child node with a constant tick frequency, wherein the inverse of the tick frequency defines a constant tick interval,
wherein the step of using a behavior tree comprises an executor application executing the behavior tree, wherein the method comprises:
a node providing a tick request to the executor application, and
in response thereto, the executor application causing the root node to call its child node at a time, wherein a time difference of this time minus a last previous time when the root node called its child node is smaller than the constant tick interval.

13. The method according to claim 12, wherein the constant tick frequency is in a range of 0.1 Hz to 100 Hz.

14. The method according to claim 12, wherein the node provides a tick request to the executor application based on a status change of the node, a status change of one of its child nodes and/or a status change of a subtree disposed hierarchically below the node.

15. The method according to claim 12, wherein the method includes the step of the executor application calling the root node independent of the constant tick interval upon receiving a tick request.

16. The method according to claim 1, wherein each of a plurality of the nodes comprises at least one data element indicator indicating at least one data element related to the respective node.

17. The method according to claim 16, wherein the at least one data element indicator comprises at least one changing value data indicator, wherein each changing value data indicator indicates a data element whose value is required to be updated whenever the respective node is called.

18. The method according to claim 16, wherein the at least one data element indicator comprises at least one output data indicator, wherein each output data indicator indicates a data element accessible by at least one node other than the node comprising the respective output data indicator.

19. A system for controlling an apparatus, the system comprising a processing module configured to use a behavior tree for tasks performed by the apparatus, wherein the system is configured to perform the method according to claim 1.

20. A computer program product embodied in a non-transitory computer readable storage medium and comprising computer instructions for performing the method according to claim 1.

* * * * *